Jan. 30, 1962

G. PETERSON 3,019,414

METHOD OF AND APPARATUS FOR PRODUCING AND
TRANSMITTING BOREHOLE SIGNALS

Filed Nov. 12, 1957

INVENTOR.
Glen Peterson

BY
Robert K. Schumacher
ATTORNEY

United States Patent Office 3,019,414
Patented Jan. 30, 1962

3,019,414
METHOD OF AND APPARATUS FOR PRODUCING
AND TRANSMITTING BOREHOLE SIGNALS
Glen Peterson, Tulsa, Okla., assignor to Well Surveys,
Incorporated, Tulsa, Okla., a corporation of Delaware
Filed Nov. 12, 1957, Ser. No. 695,954
12 Claims. (Cl. 340—18)

This invention relates to the art of geophysics and particularly to the art of well-logging wherein cased boreholes are logged with radio-activity equipment, and the like, and casing collars and other magnetic irregularities in the casing are tallied as points of reference, or otherwise employed with the radioactivity logs.

The usual well-logging system for cased boreholes provides one or more radioactivity logs, for example, a gamma ray and a neutron log, and associated with these, a casing collar log. The latter is generally employed to identify points of reference below the surface of the earth more accurately than can be done with the well-logging cable alone. The cable, although it is usually clad in an armour of steel wires, stretches considerably, and when depth measurements depend upon it alone, large errors in depth can result. On the other hand, the steel casing, while it may have stretched somewhat in going into the hole, is generally set in concrete and thereafter provides a permanent system of reference marks.

Fortunately, the casing comes in pieces or sections of about twenty feet in length, and these pieces or sections are fastened together by means of collars or threaded flush-type joints, or the pieces may in some instances be welded together. In any event, each collar or joint provides a magnetic discontinuity capable of producing a signal in a suitable detector, and this signal can, in turn, be used to make a mark on the record. Thus, the collars or joints provide a permanent and accurate depth record having a spacing of about twenty feet, and from one or more of these marks all important depth measurements can be made in the well.

For example, the radioactivity logs reveal, among other things, the important lithologic characteristics of the borehole, and the position of these characteristics can be accurately related to the nearest casing collar mark and, thereby, the depth of the characteristic below the surface of the well may be accurately determined. If a particular lithologic characteristic is being used in formation correlations from one well to another, very accurate correlations can be made by using the record marks which the casing collars or joints provide. Again, if the lithologic characteristics indicate producing formations, the casing can be accurately perforated at just the correct depths by lowering a perforator and making depth measurements from the nearest casing collars or joints.

Older types of casing sections are joined together by means of collars, as is well-known, and these collars are considerably thicker than the remaining portions of the casing. Too, gaps between the two sections of casing being joined are often left within the collars. Detectors are available which have little or no difficulty in producing electric signals from these greatly thickened sections or casing gaps. More recent types of casing sections have been fastened together by threaded flush-type points which provide little or no difference in cross-section and have practically no gap at the joint as compared with sections elsewhere. Such joints provide very much smaller signals than do the old-fashioned collars.

It is also found that each piece of casing, due to the non-uniform distributions of the metal elements from which it is made, non-uniform heating and work hardening; etc., has a magnetic characteristic peculiar to it. Signals are therefore sometimes produced in collar detectors by other portions of the casing string than the joints. Since these magnetic pecularities are generally fixed and permanent in the casing, they can also be used, when desired, to make additional depth marks on the record, or to identify a particular piece of casing. But the amplitude of the signals produced by the non-uniform character of a piece of casing may be even smaller than those produced by a flush joint, and to make anything out of them requires an excellent detector and an excellent transmission system.

In particular, the transmission system must have a very large dynamic range. Whereas, older logging systems employed batteries carried with the borehole instrument, it has become customary to energize the subsurface instrument with electrical power transmitted down the logging cable. For this purpose both alternating currents and direct currents have been used and each form of power has certain advantages and disadvantages. In this connection it is important to note that one form of casing collar signal transmission system may be compatible with transmitting A.-C. power down the hole and entirely incompatible with transmitting D.-C. power, or vice versa.

Because many collar or joint signals, at the detectors, are small in amplitude, it is customary in many well-logging systems to provide an amplifier in the subsurface instrument so that the collar signals reaching the surface will register above the background noise. Or it may be necessary to provide such additional apparatus as rectifiers, filters and carrier modulators, as the transmission system employed may dictate, so that the collar signals can be separated from other signals being handled by the system or from the down-hole power. Because of the smallness of the signals, and for other reasons, it is also customary in casing collar locators to provide high impedance detectors so that the signals produced by the collars will be as large as possible. Since most collar detectors are of the inductive or magnetic type, this means many turns of fine wire about some kind of a magnetic core. And since the logging cable is a transmission line which must be operated at low impedance, it also means that the high impedance detector must be shunt fed into the line or logging cable. This defect in collar detectors is alone responsible for some of the worst limitations placed on the entire signal transmission system.

Since it is generally desirable and considerably more economical to employ a "single-conductor" logging cable, all of the signals produced by the borehole instrument and all of the currents conveying power to the borehole instrument must, in the ideal system, be handled by the single central conductor and external sheath of the single-conductor logging cable. This, in turn, often causes auxiliary equipment to be added to the subsurface instrument. Again, with the trend toward many simultaneous logs, transmission space on the single conductor system is often greatly limited, and some transmission systems in use today, require that a considerable fraction of the transmission space be allocated to the transmission of casing collar signals.

In well-logging equipment, it is also highly desirable to keep the volume of space required by the subsurface instrument at a very minimum. Excessively long instruments are difficult to handle at the well head, and the longer they are the more apt they are to get lodged in the well. With instrument diameter restricted by the size of the well, it is highly desirable to provide well logging transmission systems which require the least number of parts and pieces.

Prior art well-logging systems suffer from one or more of the foregoing difficulties and limitations. Accordingly, the purpose of this invention is to provide a well-logging system which does not suffer from any of these limitations, particularly a casing-collar transmission system which does not impose any constraints on the other signal channels of the system.

One object of the invention is to provide a well-logging transmission system which requires the least number of elements in the subsurface instrument for producing and transmitting casing collar signals. A second object is to provide a well-logging transmission system which uses practically no signal transmission space on the cable. A subsidiary object to the second is to provide means whereby the signal transmission space employed for casing collar location is at the very lowest end of the frequency spectrum. A fourth object is to provide a well-logging transmission system, including casing collar location, which meets the foregoing objectives and is also compatible with the transmission of currents for the energization of subsurface instruments. A fifth object is to provide low-impedance casing collar detection apparatus in the subsurface instrument, and low impedance signal separation apparatus in the surface instrument whereby single conductor cable can be most efficiently utilized. A sixth object is to provide a casing collar locator system whereby the very weakest of collar signals generated in the subsurface instrument will be transmitted up the cable and can be separated from the noise background by the surface instrument. A seventh object is to provide a well logging system capable of accommodating casing collar signals having an enormous amplitude range without interference with other well-logging signals which must be handled by the system. These and other objects and advantages of the present invention will become apparent from the following detailed description when considered with the accompanying drawings, wherein:

Figure 1:
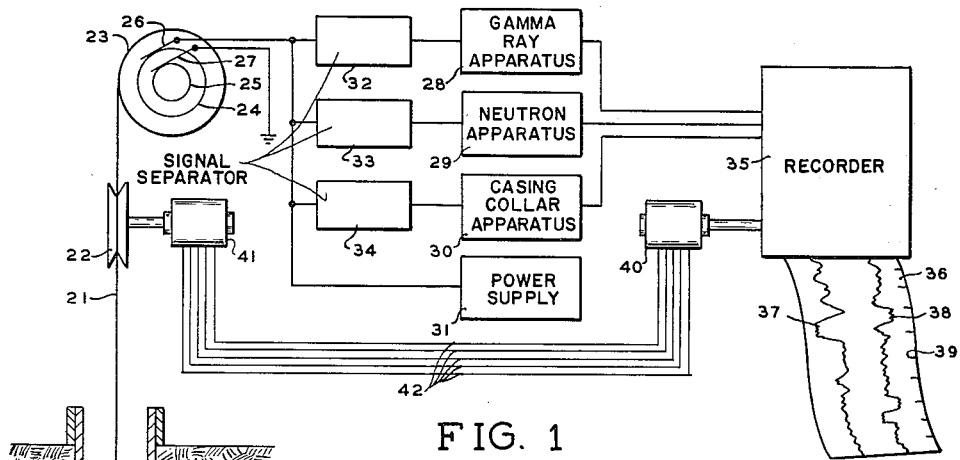
FIGURE 1 is a diagrammatic representation of a typical multi-channel radioactivity well logging system.

Referring to the drawings in detail, particularly to FIGURE 1, there is illustrated schematically a multi-channel radioactivity well logging system in which a portion of the earth's surface 10 is shown in vertical section. A well 11 penetrates the earth's surface and for purposes of the present invention is shown cased with steel casing 12. The casing is in several sections which are joined together by means of collars 13, and there are typical gaps 14 between sections of casing. Disposed within the well is a subsurface instrument 15 comprising a portion of the well-logging system. This subsurface instrument 15 comprises neutron source 16, neutron detector 17, gamma ray detector 18, pulse amplifier 19 and casing collar detector 20. These portions of the instrument are contained within a housing which may or may not be broken as shown. The casing collar detector 20 is usually housed in a non-magnetic stainless steel jacket while the remaining portions of the subsurface instrument are generally housed in hardened casings of the toughest steels available to withstand the high external hydrostatic pressures encountered in deep liquid-filled boreholes.

The entire subsurface instrument 15 is suspended in the well 11 by means of cable 21 which is preferably of the single conductor type although it need not necessarily be so. Cable 21 passes over a depth-measuring sheave 22 and is wound on drum 23 of a suitable hoisting mechanism. This drum is equipped wtih slip rings 24 and 25, to which the inner conductor and external sheath, respectively, of the single conductor logging cable 21 are electrically connected. Brushes 26 and 27 make wiping electrical connections to the slip rings 24 and 25, and from these brushes connections are carried to the surface apparatus. The slip ring which connects to the cable sheath is generally grounded, as shown, and it is assumed that other portions of the apparatus have ground returns.

A multiplicity of arrangements of the surface apparatus are in use today and the one shown here is a generalized arrangement more or less typical of all. For example, 28 might be a gamma ray processing apparatus, 29 a neutron processing apparatus, 30 a casing collar processing apparatus and 31 a generator which supplies the power for energizing the subsurface instrument. Boxes 32, 33 and 34 represent signal separating apparatus which may or may not be necessary in any given system.

After separation and appropriate processing the neutron, gamma ray and casing collar signals are fed into a suitable recorder 35 where a permanent record is made on a moving chart 36 of the signal excursions which take place in the subsurface instrument 15 as it is raised or lowered in the well 11. For example, 37 might be the excursion of the gamma ray signal, 38 that of the neutron signal and 39 is a typical "pip" or mark produced when collar detector 20 passes a collar. Often 39 is not a single mark, rather it frequently consists of two or three pulses. With the old fashioned collars, such as shown in FIG. 1, each collar signal is usually composed of three pulses as produced by each end of the collar and the casing separation 14 within the collar. Since, however, collars are not usually over six or eight inches in length, these pulses may appear as one mark on the record because of the inability of some part of the casing collar apparatus to resolve or separate the distinct pulses.

The chart 36 is moved by receiving synchro 40, usually through a set of reduction gears, not shown specifically, and synchro 40 is, in turn, operated by transmitting synchro 41, and the latter is rotated by means of depth measuring sheave 22. Thus, depending upon the diameter of sheave 22, and the gear reduction within the recorder, chart 36 moves in a certain scale ratio with respect to logging cable 21. But due to the stretch in the logging cable, as before mentioned, as well as inaccuracies in the measuring sheave, etc., there is not a precise relation between positions on chart 36 and positions of instrument 15 in the borehole. But since collar detector 20 is precisely fixed to gamma ray detector 18 and neutron detector 19 in the instrument 15 and since casing 12 with collars 13 is permanently located in the well, there is an accurate depth relation between collar marks 39 and characteristic changes in logs 37 and 38. Thus, the position within the well of the formations giving rise to the characteristic deflections manifest in the logs can be accurately fixed in depth within the well.

In FIGURE 1, 42 is the five wire cable which generally joins a pair of synchros.

Figure 2:
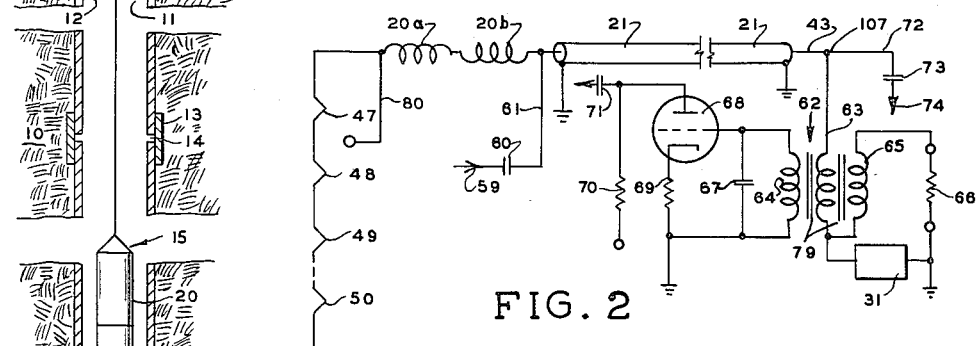
FIGURE 2 illustrates schematically the apparatus in the preferred well logging system of the present invention.

FIGURE 2 illustrates the preferred form of the present invention. 21 is, as before, the single-conductor cable, 20a and 20b are the two inductance coils which comprise a basic portion of the collar detector 20. They are placed in series with the central conductor 43 of logging cable 21 and other portions of the subsurface apparatus, as shown. Typically, there are some vacuum tubes in the subsurface instrument and these tubes have heaters indicated by 47, 48, 49 and 50, the power to heat which is supplied via the logging cable 21 and flows through collar locator coils 20a and 20b. Likewise, power for the plates of the tubes is supplied through the collar locator coils 20a and 20b and conductor 80.

In FIGURE 2, 59 and 61 indicate connections and 60 a coupling and isolation condenser by means of which other signals, for example, the gamma ray and neutron signals, are shunt fed into the central conductor 43 of the logging cable at a point between the collar detector coils and the cable termination. It is significant to note that a filter between detector coils 20a and 20b and the junction of 61 with the cable is unnecessary in preventing neutron-and-gamma ray-produced pulses from being shorted out through the vacuum tube heaters. The inductance of coils 20a and 20b plus the resistance of these coils and the tube heaters is more than sufficient as one termination for the subsurface pulse load.

It is also important to note that if the subsurface power is not fed through collar detector coils 20a and 20b, then these coils must be shunt terminated into the logging line through a coupling and isolation condenser. Due to the exceptionally slow rate at which the collar pulses vary, a condenser of many thousand of microfarads would be required; or as is commonly done, the slowly-varying pulses modulated onto a higher-frequency carrier, thus requiring a considerable extra bulk of apparatus in the subsurface instrument.

Passing to the surface end of the apparatus shown in FIG. 2, 62 is a special type of transformer having a primary 63, a secondary 64 and a tertiary 65 by means of which power is fed to the borehole instrument and collar signals are extracted from the line. As before stated in connect with FIG. 1, 31 is a generator which supplies power to the subsurface instrument; in the present instance it is a D.-C. power supply, preferably of the current regulated variety. Due to the fact that the resistance of the logging cable may vary as much as 100% because of the temperature excursions found in boreholes, the best voltage regulation at the subsurface instrument is obtained by current regulating the source. This, in turn, derives from the fact that the subsurface instrument load is predominately comprised of the heaters of vacuum tubes, and secondarily of vacuum tube plates and screens. The overall resistance of this load will not vary more than a few percent over the whole range of borehole temperature variations. Thus, by providing a current regulated power source, at the surface, and hence a steady current through cable and load, the voltage across the subsurface load is at least as steady as the load resistance and is unaffected by the resistance variations of the cable.

As can be seen, the current from power supply 31 flows through transformer primary 63, down the logging cable 21, via center conductor 43, through casing collar detector coils 20a and 20b, through vacuum tube heaters 47, 48, 49 and 50, and also through the vacuum tube plate cathode circuits, via cathode bias resistors. The plate-cathode circuits are arranged in shunt to the vacuum tube heater string, and are connected to conductor 80.

Current from power supply 31 also flows through transformer tertiary 65 and resistor 66. The windings 63 and 65 are wound in opposition on transformer core 79, or at least connected to 31 so that the current through 63 produces a magnetomotive force which is exactly opposed by magnetomotive force due to the current flowing in winding 65. In this way the current fluctuations of power supply 31 do not produce significant noise voltages in transformer secondary 64 which might be confused with casing collar signals or at least produce such a noisy background that many of the casing collar signals could not be identified or even seen.

It so happens that even a well-regulated power supply has an ultimate background of voltage or current variations which, though small, may be at least as large as the unamplified casing collar signals which arrive at the top of the cable. It also so happens that many of these power supply variations have about the same period as the casing collar signals and cannot be separated therefrom by any of the customary filtering techniques. The present invention solves this problem by providing a common power supply to produce the useful down-hole current and the bucking current in the tertiary 65. Thus the power supply variations are conveniently opposed within transformer 62 and so do not produce significant noise voltages across transformer secondary 64.

Continuing with the description of FIG. 2, 68 is a vacuum tube having at least a grid, a hot cathode and a plate. 67 is a condenser used to shunt tune winding 64, 69 is a cathode bias resistor, 70 is a plate load resistor, and 71 is a condenser by means of which additional collar signal amplifying or processing stages are coupled to the first stage. 72 and 74 are connecting leads, and 73 a coupling and isolation condenser whereby other signal channels are connected to the system. For example, 73, in FIGURE 2, might be identically the same element as 32 or 33 of FIGURE 1. Obviously, as many coupling condensers, such as 73, may be used as are required or desirable without departing from the invention. The coupling condensers 60 and 73 also serve to isolate the direct current flowing in the logging cable and thus prevent it from being dissipated in the signal leads.

Since the casing collar signals are slowly varying, it is desirable that transformer 62 be composed of windings having the highest possible inductances consistent with reasonable size. Thus, if care is exercised in the construction of 62, to keep the distributed capacitance of winding 63 as low as possible, no additional isolation is required to prevent the signal pulses of the radioactivity channels from becoming dissipated in the transformer and power supply.

Figure 3:
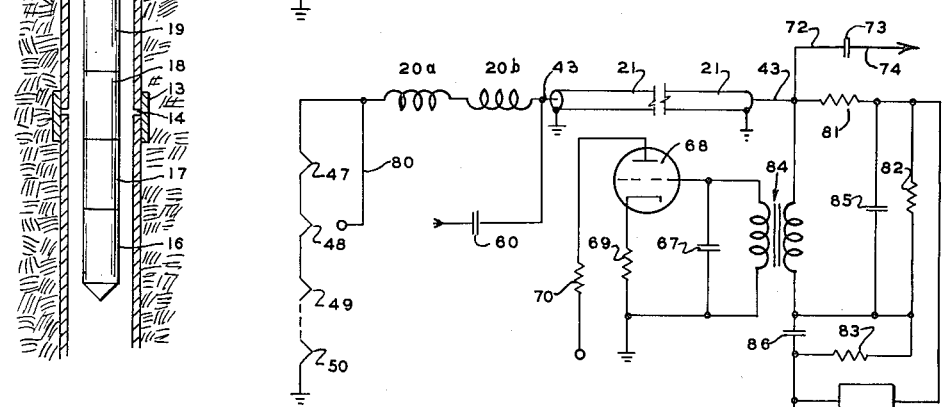
FIGURE 3 is a schematic system diagram of an alternative form of the present invention.

Referring to FIGURE 3, the surface apparatus comprising the casing collar signal channel has been altered to provide additional means whereby the present invention may be practiced. The subsurface apparatus has not been changed, however, nor have certain portions of the surface apparatus. Accordingly, like numerals in the two figures refer to identically the same elements. While the same basic principles have been applied in deriving the circuit of FIG. 3, as were used in FIG. 2, the three-winding transformer has been replaced by a bridge of resistors 81 and 82 and a two-winding transformer 84. The subsurface current flows from power supply 31 through resistance 81 and thence to the logging cable and subsurface load. A branch of current is also taken off from 31 and flows through resistors 82 and 83. A two-winding transformer 84 is connected across the junction of 81 and 83 and the junction of 82 and 83. If 82 and 83 are adjusted relatively to 81 and the subsurface load so that the voltage drops across 81 and 82, as produced by power supply current, are equal, then any variations in current produced by the power supply will not appear across transformer 84 but will cancel in the resistors 81 and 82. But currents generated in the subsurface load, as by the casing collar detector, will not be balanced out and so will appear as voltages across resistors 81 and 82. Another way of looking at it is that the subsurface load, including the collar detecting coils 20a and 20b, and resistors 81, 82 and 83 are all connected in series to form a four-arm bridge. The power supply 31 appears across one diagonal of this bridge structure while the transformer 84 appears across the other diagonal. Thus, if the bridge is balanced, variations in voltage at the power supply terminals will not be transferred to the transformer terminals. But the collar detector coils comprises a generator which appears in one of the four bridge arms, and voltages generated in this bridge arm will appear at the transformer terminals.

To economize on power supply power, resistors 82 and 83 are preferably made quite large with respect to resistance 81. Thus, the sum of 81, 82 and 83 may be many fold larger than the generating impedance of the casing collar detector coils 20a and 20b, and therefore a bad mismatch. To remedy this, condensers 85 and 86 are shunted across resistors 82 and 83, respectively. These condensers are preferably high value electrolytics chosen of such values as to be inversely related to resistors 82 and 83 so that the bridge balance will not be disturbed appreciably, but so that the casing collar signals are given a by-pass path of lower impedance than that afforded by 82 and 83. In this way the transfer of casing collar signals to transformer 85 is somewhat improved. Alternatively, the condenser 85 can be left out but 86 included, and transformer 84 designed to match the generator impedance into tube 68.

The collar detectors employed by this invention are of the generative type, and many forms are applicable. The detectors of my co-pending patent application, Serial No. 648,131, filed March 25, 1957, now U.S. Patent No. 2,967,994 may be used. Likewise those disclosed by the patent application of Gilbert Swift, Serial No. 780,620 filed December 15, 1958.

The casing collar and radioactivity signal transmission system here disclosed has an enormous dynamic range since means have been provided for handling collar signal voltages ranging from fractions of a millivolt to volts. Because these signals have a frequency content from 0 to a few cycles per second, it is seen that they will not interfere with the radioactivity signals which predominately cover the band from a few hundred cycles per second upward.

Numerous other variations and modifications may also be made without departing from the invention. Accordingly, it should be clearly understood that those forms of the invention described above and shown in the figures of the accompanying drawings are not intended to limit the scope of the invention.

I claim:

1. In a well logging system in which D.C. power is supplied from a surface power supply to a subsurface instrument over at least one conductor of an instrument supporting cable over which an intelligence signal is transmitted in the opposite direction at a frequency and magnitude comparable to variations of the voltage supplied by said power supply to said conductor, improved means at the surface for separating said intelligence signal from the power supply variations, said means comprising utilization means coupled to said conductor utilizing the combined signal at said frequency appearing thereon at the surface, means deriving from said power supply a compensating signal proportional to the output voltage of said power supply, and means applying said compensating signal to said utilization means in a differential manner substantially cancelling the effect of variations of said power supply voltage on said utilization means.

2. In a well logging system in which D.C. power is supplied from a surface power supply to a subsurface instrument over at least one conductor of an instrument supporting cable over which an intelligence signal is transmitted in the opposite direction at a frequency and magnitude comparable to variations of the voltage supplied by said power supply to said conductor, improved means at the surface for separating said intelligence signal from the power supply variations, said means comprising a transformer having a core and primary, secondary and tertiary windings, means connecting said primary winding between said power supply and said conductor, means connecting said power supply to said tertiary winding in a manner producing a field opposite to that produced by current from said power supply through said primary winding, a current limiting impedance connected in series with said tertiary winding to limit current therethrough to that producing magnetomotive force in said core equal and opposite to that produced therein by current from said power supply flowing in said primary in absence of signal, and indicating means connected across said secondary winding indicating the net signal transmitted to said secondary winding through said core.

3. In a well logging system in which D.C. power is supplied from a surface power supply to a subsurface instrument over at least one conductor of an instrument supporting cable over which an intelligence signal is transmitted in the opposite direction at a frequency and magnitude comparable to variations of the voltage supplied by said power supply to said conductor, improved means at the surface for separating said intelligence signal from the power supply variations, said means comprising an isolating impedance connected between said power supply and said conductor, a voltage divider connected across said power supply selected to derive a compensating signal equal to the voltage between ground and said conductor at the surface developed by said power supply, and means indicating the difference between said compensating signal and the combined voltage on said conductor.

4. In a well logging system in which D.C. power is supplied from a surface power supply to a subsurface instrument over at least one conductor of an instrument supporting cable through at least one pickup coil of a casing collar detector which develops an intelligence signal at a frequency and magnitude comparable to variations of the voltage supplied by said power supply to said conductor, improved means at the surface for separating said intelligence signal from the power supply variations, said means comprising an isolating first resistance connected between said power supply and said conductor, second and third resistors connected in series across said power supply, the resistances of said second and third resistors being in the same ratio as the resistance of said first resistor and the resistance between ground and said conductor at the surface through said conductor and pickup coil, and means for indicating the potential difference at said frequency between said conductor at the surface and the junction of said second and third resistors.

5. A well logging system comprising a cable having at least one electrical conductor, an instrument housing suspended in a well on said cable, a surface D.C. power supply connected to said conductor, a casing collar detector which develops an intelligence signal indicative of well casing joints at a frequency and magnitude comparable to variations of the voltage supplied by said power supply to said conductor, said detector including at least one pickup coil in said housing connected by a D.C. path to said conductor, a transformer having a core and primary, secondary and tertiary windings, means connecting said primary winding between said power supply and said conductor, means connecting said power supply to said tertiary winding in the manner producing a field opposite to that produced by current from said power supply through said primary winding, a current limiting impedance connected in series with said tertiary winding to limit current therethrough to that producing magnetomotive force in said core equal and opposite to that produced therein by current from said power supply flowing in said primary in absence of signal, and indicating means connected across said secondary winding indicating the net signal transmitted to said secondary winding through said core.

6. A well logging system comprising a cable having at least one electrical conductor, an instrument housing suspended in a well on said cable, a surface D.C. power supply connected to said conductor, a casing collar detector which develops an intelligence signal indicative of well casing joints at a frequency and magnitude comparable to variations of the voltage supplied by said power supply to said conductor, said detector including at least one pickup coil in said housing connected by a D.C. path to said conductor, surface utilization means coupled to said conductor utilizing the combined signal at said frequency appearing thereon at the surface, means deriving from said power supply a compensating signal proportional to the output voltage of said power supply, and means applying said compensating signal to said utilization means in a differential manner cancelling the effect of variations of said power supply voltage on said utilization means.

7. Apparatus for producing electrical signals in a borehole and transmitting said signals therefrom to the surface of the earth, said apparatus comprising a subsurface instrument, a surface instrument, and a hoisting and current conducting cable interconnecting said subsurface instrument with said surface instrument, said subsurface instrument comprising at least one electrical circuit having a power input and a signal output, and a casing collar detector capable of emitting an electrical signal in response to traversal of said detector past a casing joint, said surface instrument comprising means for separating signals emitted by said casing collar detector from signals of said electrical circuit, at least one signal processing circuit, means for independently recording the signals from said signal processing circuit, and D.C. power supply means for supplying electrical power to said subsurface instrument, said power supply means being connected to one end of said cable, said casing collar detector comprising at least one coil connected in series between the other end of said cable and the power input of said electrical circuit, the signal output of said electrical circuit being connected to said other end of said cable in shunt relation with said casing collar detector coil and said power input, and said signal processing circuit being connected to said one end of said cable in shunt with said power supply means.

8. A telemetering system for geophysical exploration apparatus comprising at least one radioactivity detection circuit having a power input and a signal output, a casing collar detector including at least one coil capable of emitting an electrical signal in response to traversal of said detector past a casing joint, a cable having at least one electrical conductor, a D.C. power supply, said casing collar detector coil and said conductor of said cable being connected in series between said power supply and the power input of said radioactivity detection circuit to pass electrical power from said power supply to said radioactivity detection circuit, the signal output of said radioactivity detection circuit being connected to said conductor in shunt relation with said casing collar detector coil and said power input to impress signals on said conductor, and at least one signal processing circuit connected to the conductor of said cable in shunt relation with said power supply to receive and process signals from said radioactivity detection circuit, said signal processing circuit including means for separating signals emitted by said casing collar detector from signals of said radioactivity detection circuit.

9. A telemetering system for geophysical exploration apparatus comprising at least one radioactivity detection circuit having a power input and a signal output, a casing collar detector of the type which emits an electrical signal in response to traversal of said detector past a casing joint, a cable having at least one electrical conductor, a D.C. power supply, a transformer having primary, secondary and tertiary windings, the primary winding of said transformer being connected in series between said power supply and the conductor of said cable, said casing collar detector being connected in series between the conductor of said cable and the power input of said radioactivity detection circuit, the signal output of said radioactivity detection circuit being connected in shunt relation with said casing collar detector, at least one signal processing circuit connected between the conductor of said cable and the primary winding of said transformer in shunt relation with said power supply for receiving and processing signals from said radioactivity detection circuit, the tertiary winding of said transformer being wound in opposition to said primary winding and being connected across said power supply, a resonant circuit including the secondary winding of said transformer and serving to pass signals from said casing collar detector, and means connected to the secondary winding of said transformer for receiving and processing the signal from said casing collar detector.

10. Apparatus for producing electrical signals in a borehole and transmitting said signals therefrom to the surface of the earth, said apparatus comprising a subsurface instrument, a surface instrument, and a hoisting and current conducting cable interconnecting said subsurface instrument with said surface instrument, said subsurface instrument comprising a power input circuit, a signal output circuit, and a casing collar detector capable of emitting an electrical signal in response to traversal of said detector past a casing joint, said surface instrument comprising means for separating signals emitted by said casing collar detector from signals of said signal circuit in at least one signal processing circuit, means for independently recording the signals from said signal processing circuit, and power supply means for supplying electrical power to said subsurface instrument, said power supply means being connected to one end of said cable, said casing collar detector comprising at least one coil connected in series with the power input circuit to the other end of said cable, the signal output circuit being connected to said other end of said cable in shunt relation with said casing collar detector coil and said power input circuit, and said signal processing circuit being connected to said one end of said cable in shunt with said power supply means.

11. A telemetering system for geophysical exploration apparatus comprising at least one subsurface radioactivity detection circuit having a power input and a signal output, a subsurface casing collar detector including at least one coil capable of emitting an electrical signal in response to traversal of said detector past a casing joint, a well logging cable having at least one electrical conductor, a surface power supply connected to said conductor, said casing collar detector coil and said conductor of said cable being connected in series with the power input of said radioactivity detection circuit to pass electrical power from said power supply to said radioactivity detection circuit, the signal output of said radioactivity detection circuit being connected to said conductor in shunt relation with said casing collar detector coil and said power input to impress signals on said conductor, and at least one signal processing circuit connected to the conductor of said cable at the surface in shunt relation with said power supply to receive and process signals from said radioactivity detection circuit, said signal processing circuit including means for separating signals emitted by said casing collar detector from signals of said radioactivity detection circuit.

12. A telemetering system for geophysical exploration apparatus comprising at least one radioactivity detection circuit having a power input and a signal output, a casing collar detector of the type which emits an electrical signal in response to traversal of said detector past a casing joint, a cable having at least one electrical conductor, a D.C. power supply, a transformer having primary, secondary and tertiary windings, the primary winding of said transformer being connected in series between said power supply and the conductor of said cable, said casing collar detector being connected in series between the conductor of said cable and the power input of said radioactivity detection circuit, the signal output of said radioactivity detection circuit being connected in shunt relation with said casing collar detector, at least one signal processing circuit connected between the conductor of said cable and the primary winding of said transformer in shunt relation with said power supply for receiving and processing signals from said radioactivity detection circuit, the tertiary winding of said transformer being wound in opposition to said primary winding and being connected across said power supply, a resonant circuit including the secondary winding of said transformer and serving to pass signals from said casing collar detector, and means connected to the secondary winding of said transformer for receiving and processing the signal from said casing collar detector.

References Cited in the file of this patent
UNITED STATES PATENTS

| | | |
|---|---|---|
| 2,349,225 | Scherbatskoy | May 16, 1944 |
| 2,481,014 | Herzog | Sept. 6, 1949 |
| 2,554,844 | Swift | May 29, 1951 |
| 2,586,745 | Tullos | Feb. 19, 1952 |
| 2,659,014 | Scherbatskoy | Nov. 10, 1953 |
| 2,703,491 | Goetz | Mar. 8, 1955 |